United States Patent
Jo

(10) Patent No.: US 8,618,686 B2
(45) Date of Patent: Dec. 31, 2013

(54) WAVE POWER GENERATOR

(76) Inventor: Chang-Hui Jo, Goyang-si (KR)

(*) Notice: Subject to any disclaimer, the term of this patent is extended or adjusted under 35 U.S.C. 154(b) by 134 days.

(21) Appl. No.: 13/392,067

(22) PCT Filed: Aug. 4, 2010

(86) PCT No.: PCT/KR2010/005121
§ 371 (c)(1),
(2), (4) Date: Feb. 23, 2012

(87) PCT Pub. No.: WO2011/025156
PCT Pub. Date: Mar. 3, 2011

(65) Prior Publication Data
US 2012/0153627 A1    Jun. 21, 2012

(30) Foreign Application Priority Data
Aug. 25, 2009   (KR) .................. 10-2009-0078674

(51) Int. Cl.
*F03B 13/10*   (2006.01)

(52) U.S. Cl.
USPC .......................................................... 290/53

(58) Field of Classification Search
USPC ............ 290/53, 42, 44, 54; 60/495, 505, 500; 217/330–333
See application file for complete search history.

(56) References Cited

U.S. PATENT DOCUMENTS

| | | | |
|---|---|---|---|
| 4,228,360 A * | 10/1980 | Navarro ..................... | 290/43 |
| 4,319,454 A | 3/1982 | Lucia | |
| 4,408,455 A * | 10/1983 | Montgomery ................. | 60/505 |
| 5,066,867 A * | 11/1991 | Shim ........................ | 290/53 |
| 5,311,064 A * | 5/1994 | Kumbatovic ................ | 290/53 |
| 6,099,368 A * | 8/2000 | Gorshkov .................... | 440/9 |
| 6,561,856 B1 * | 5/2003 | Gorshkov .................... | 440/9 |

(Continued)

FOREIGN PATENT DOCUMENTS

| | | |
|---|---|---|
| JP | 55-091772 | 7/1980 |
| JP | 05-164036 | 6/1993 |

(Continued)

OTHER PUBLICATIONS

Notice of Allowance issued on May 3, 2011, in corresponding Korean Patent Application No. 10-2009-00787674.

(Continued)

*Primary Examiner* — Jean F Duverne
(74) *Attorney, Agent, or Firm* — NSIP Law

(57) ABSTRACT

The present invention relates to a wave power generator, and more particularly, to a wave power generator that has comparatively high energy conversion efficiency, so that it can induce active investment and research and development to overcome uncertainties about the natural environment, and which can enhance practicability and value as a clean energy source, especially by virtue of the improved return on investment thereof. For this purpose, the wave power generator of the present invention is characterized in that is comprises: a plurality of rafts arranged on a water surface to move freely with the movement of waves; a plurality of connectors, connecting the plurality of rafts to each other, for performing the conversion of kinetic energy by converting the wave-induced movement of one raft into an amplified lever movement on an adjacent raft; a plurality of generators installed on the plurality of rafts to generate electricity; and an energy-converting unit, connected to the plurality of connectors and to the plurality of generators, for converting the kinetic energy from the plurality of connectors into rotational energy for driving the plurality of generators.

16 Claims, 19 Drawing Sheets

(56) References Cited

U.S. PATENT DOCUMENTS

| | | | | |
|---|---|---|---|---|
| 7,808,120 B2* | 10/2010 | Smith | ............................ | 290/42 |
| 8,018,084 B2* | 9/2011 | Rourke | ............................ | 290/53 |
| 8,359,855 B1* | 1/2013 | Fagan | ............................ | 60/506 |
| 2011/0115229 A1* | 5/2011 | Rourke | ............................ | 290/53 |

FOREIGN PATENT DOCUMENTS

| | | |
|---|---|---|
| KR | 20-0326768 | 9/2003 |
| KR | 10-2006-0130875 A | 12/2006 |
| WO | WO 2011/025156 A2 | 3/2011 |
| WO | WO 2011/025156 A3 | 3/2011 |

OTHER PUBLICATIONS

Search Report issue on Sep. 14, 2010, in corresponding PCT International Application No. 10-2009-0078674.

\* cited by examiner

W = IS DETERMINED BY WAVE ENERGY LEVEL AND DESIGN OUTPUT
L = IS LESS THAN 1/2 OF DESIGN WAVELENGTH

L : WHEN WATER LEVEL IN CONSTANT PRESSURE
    TANK IS -10 M, CALCULATE ALLOWANCE LENGTH
    CONSIDERING VOLUME REDUCTION CAUSED
    BY WATER DISCHARGE FOR POWER GENERATION

WAVE POWER GENERATOR

TECHNICAL FIELD

Considering the present invention of clean energy generation from wave power, for encouraging active investment and research activities to the wave power generator, power generation system is to have relatively high conversion efficiency from wave energy and complementing irregular output from uncertainty of environment by nature, and to enhance practice and value as a clean energy resources, especially by virtue of the improved return on investment thereof.

BACKGROUND ART

Our future is being threatened by exhaustion of fossil fuel resources, increasing cost pressure of energy due to reduced production and cost advancing pressure from oil-producing countries, and serious environmental pollution coming out from energy consumption.

In addition, conventional power generation system using fossil fuels, there are various power generation systems using various kinds of energy resources such as nuclear energy, tidal energy, water energy, wind energy, solar energy, bio energy, and so on.

However, nuclear energy even having economic feasibility has been restrictively developed only in some countries due to the Nuclear Nonproliferation Treaty and radioactive contamination, meanwhile water energy and tidal energy require proper site location satisfying system requirements, anticipated excessive investment and long-term construction period, while solar energy and wind energy require storage cell due to intermittent generation and higher cost. Accordingly, development of novel power generation system using clean energy is still needed.

Considering those systems consuming fossil fuels, future-oriented new power generation systems using clean energy resources must be competitive in construction costs and operation cost to the conventional electric power systems including land occupations, anticipative investments, construction periods, social costs from environmental pollution, and so on. In addition, the novel power generation system must have high annual operation rate and be free from expensive storage equipment or auxiliary power generation.

Meanwhile, since water having heavier mass has higher kinetic energy than air having lighter mass the technology converting kinetic energy of moving seawater, i.e., research of generating electricity from wave power is now in advance. In particular, energy resources from sea wave are out of count. However, frequency and power of waves in onshore and offshore have high fluctuations according to environment of the locations and seasons, whereas relatively lower wave height often occurs according to season's weather condition. Accordingly, if the disadvantage of practice caused by lower wave height and uneven wave period could be eliminated, uncountable wave power will be secured at no cost.

Describing in brief, even though the wave height is low, research and technology to increase conversion efficiency enabling practical use of wave energy and technology to reduce conversion loss by shortening conversion process is still needed.

Technologies of converting wave power into energy have been opened already as a movable body type (including a raft type), an oscillating water column type (an air turbine type), a tidal pressure type, a tidal potential type (a setup type), an overtopping wave energy conversion unit type, and so on.

In a state in which a distinct technology for real commercialization is not brought out yet, but several countries including the United Kingdom are focusing on research, development, and commercial operation of developed systems.

However, most countries in the world have not yet focused on investment or research on wave power generation, and only small air turbine generators have been introduced installed at marine buoys and at wave bather. Due to high fluctuation of sea wave (wave period, cycle and height) coming out from varying weather and seasons, technologies of wave power generation had been out of interest in research and investment.

It has been reported that, excluding a type in which installation of a large-scaled structure is essentially needed or energy conversion efficiency is too low to be economically inappropriate, but converting vertical movement of waves into mechanical energy using rafts is the best technology in efficiency among highly applicable technologies.

However, the method in which rafts connected each with hydraulic cylinders tied by hinges to convert wave movement into hydraulic pressure from axial movement in cylinder has disadvantages resulting from short motion stroke of the hydraulic cylinder arm and lower conversion efficiency from sharply decreasing cylinder stroke on the lower wave height.

That is, referring to FIG. 1, a radius of a quarter circle represents a maximum motion stroke of a cylinder, and it will be appreciated that while variation in momentum in a vertical direction is increased as the wave height is increased, the variation in momentum is sharply decreased when the wave height is small. That is, the cylinder motion stroke is abruptly reduced when the wave height is lowered, and thus, the energy conversion efficiency is sharply reduced. In other words, since energy is in proportion to the square of a velocity, the movement velocity of the cylinder is reduced, and thus, the wave power generator cannot be easily adapted to the waves with a low wave height. In FIG. 1, a vertical motion stroke 'a' of the raft corresponds to a cylinder motion stroke 'a', and a vertical motion stroke 'b' of the raft corresponds to a cylinder motion stroke 'b'.

Eventually, various conventional wave power generators in stages of development and practical use have various difficulties such as inactive investment and research caused by fearing low efficiency of energy conversion and uncertainties of natural environment and energy outputs, and impracticability caused by following high investment and low return, and thus, supplements thereof are needed.

Meanwhile, as described above, while technology converting wave energy into kinetic energy by rafts raised and lowered according to wave level has large variation in output and instability against windstorms, still considering higher conversion efficiency and lower manufacturing cost, the technology using moving bodies may be most advantageous in economic feasibility and efficiency.

FIG. 2 shows a hinge-type hydraulic conversion apparatus among various conventional wave power generation systems in which a pair of rafts 1101 and 1102 are provided, and a hydraulic cylinder 1104 is connected to the rafts via hinges 1103.

In FIG. 1, a radius of a quarter circle represents a maximum motion stroke of the cylinder, and it will be appreciated that while variation in momentum in a vertical direction is increased when the wave height is increased, the variation in momentum is sharply decreased when the wave height is small. That is, the cylinder motion stroke is abruptly reduced when the wave height is lowered, and thus, the energy conversion efficiency is sharply reduced.

In other words, since energy is in proportion to the square of a velocity, the movement velocity of the cylinder arm is reduced, and thus, the wave power generator cannot be easily adapted to the waves at low wave height. In FIG. 2, the vertical motion stroke F/A of the rafts 1101 and 1102 corresponds to the cylinder motion stroke C/A, and the vertical motion stroke F/B of the rafts corresponds to the cylinder motion stroke C/B. In addition, reviewing the difference in vertical and horizontal displacement of the rafts 1101 and 1102, that is, comparing the horizontal displacement at higher wave with the horizontal displacement at lower wave height, it can be seen that there is a large difference between a stroke when the wave height is low and a stroke when the wave height is high.

FIG. 3 shows a Pelamis-type hydraulic conversion apparatus, among conventional wave power generation technologies, in which a pair of rafts 1201 and 1202 are connected by a hinge 1203 and hydraulic cylinders 1204 are connected to each other outside the hinge 1203.

Considering that a wavelength W/L is generally larger by several tens of times than a wave height W/H, the wavelength W/L is larger and the wave height W/H is much smaller. Here, a stroke of the hydraulic cylinder is represented as a numerical value calculated by multiplying the wave height W/H by the distance between the hydraulic cylinders/the wavelength W/L. For example, when the interval of the hydraulic cylinders 1204 of the of the rafts 1201 and 1202 is 2 m in the waves with the wave height W/H of 1.5 m and the wavelength W/L of 30 m, a maximum stroke of the cylinder is 2×1.5/30=0.1 (m). Since the maximum stroke of each of the cylinders is 10 cm, both sides of the cylinder strokes are merely 20 cm. In other words, even though the pressure is high, when the stroke is small and a flow rate is also small, driving efficiency of a hydraulic motor should be lowered. Ultimately, in coastal environments in which the wave height W/H is small, a simple system as shown in FIGS. 2 and 3 cannot be easily adapted.

Nevertheless, it is reported that the moving body type (a raft type, a pendulum type, etc.) among the various wave power generation systems has greater efficiency in power generation than the oscillating water column type (an air turbine type), the overtopping wave energy conversion unit type (a water turbine type), the tidal pressure type, a wave pump driving type, a buoy-generator direct connection type, and so on. This is referred to in marine energy engineering. Accordingly, when a technology in which structures of the rafts and levers are effectively improved, energy conversion steps are reduced, mechanical stability and conversion efficiency are increased and output variation can be controlled is developed, the wave energy may be likely to be one of the most competitive energy resource.

DISCLOSURE

Technical Problem

The present invention is directed to a wave power generator capable of encouraging active investment and research by overcoming uncertainties of a natural environment through relatively high energy conversion efficiency, and increasing efficiency for investment to improve practicability and value as a clean energy source.

The present invention is also directed to a wave power generator capable of effectively improving structures of rafts and levers in consideration of a situation in which wavelength is relatively large, reducing energy conversion steps, increasing mechanical stability and conversion efficiency, improving practicability and value as the most competitive energy source by controlling output variation (fluctuation) and securing the leveling of power output.

Technical Solution

One aspect of the present invention provides a wave power generator including: a plurality of rafts that are disposed on a surface of water and freely move according to surface level of wave; a plurality of couplers, each of which interconnects the neighboring rafts, and converts a wave motion of one of the rafts into an amplified lever motion of the other raft in order to convert kinetic energy; a plurality of generators that are installed on the respective rafts so as to generate electricity; and energy conversion units that are connected to the respective couplers and generators and convert the kinetic energy from the couplers into rotational energy for driving the generators.

Another aspect of the present invention provides a wave power generator including: a first raft that is disposed on a surface of water, freely moves according to wave level, has a barge shape in which a fluid can be filled to adjust a submergence depth, and has a length in a wave progress direction smaller than ½ of a designed wavelength; a second raft that is connected to the first raft at a position near the first raft in a longitudinal direction thereof, and has the same structure as the first raft; a lever configured to interconnect the first and second rafts; and an energy generation unit that is connected to the lever and activates generator using kinetic energy of the lever.

Advantageous Effects

As described above, according to an embodiment, since a wave power generator has relatively high energy conversion efficiency, active investment and research can be encouraged by overcoming uncertainties of a natural environment, and efficiency for investment can be increased to improve practicability and value as a clean energy resources.

According to anther embodiment, a wave power generator can effectively improve structures of rafts and levers in consideration of a situation in which a wavelength is relatively large, reduce energy conversion steps, increase mechanical stability and conversion efficiency, improve practicability and value as the most competitive energy resource by controlling output fluctuation, and secure leveling of output power.

MODE FOR INVENTION

Hereinafter, exemplary embodiments of the present invention will be described in detail with reference to the accompanying drawings.

Figure 4:
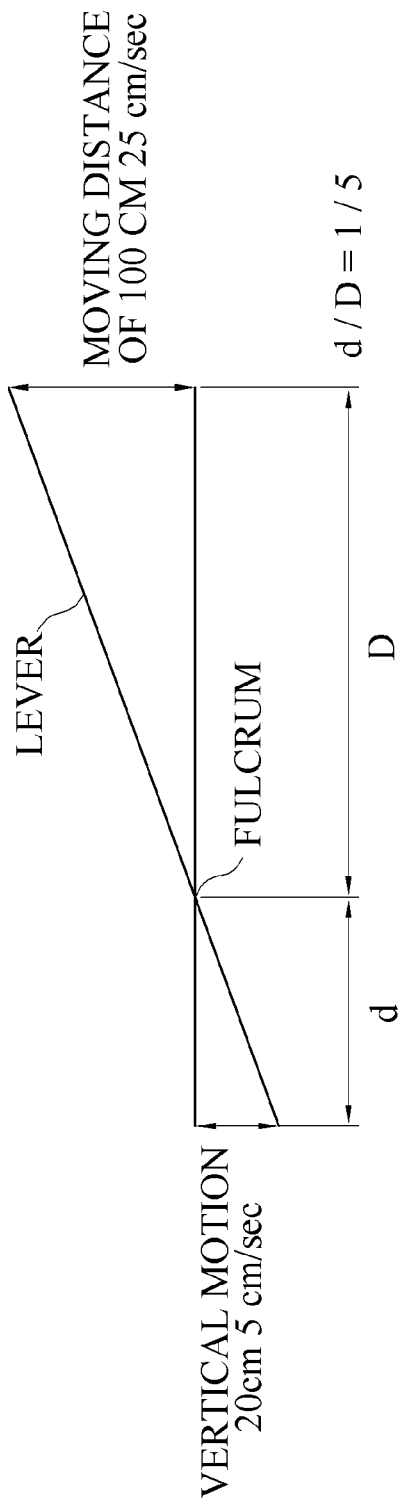
FIG. 4 is an explanatory view of the principle of leverage.
Figure 5:
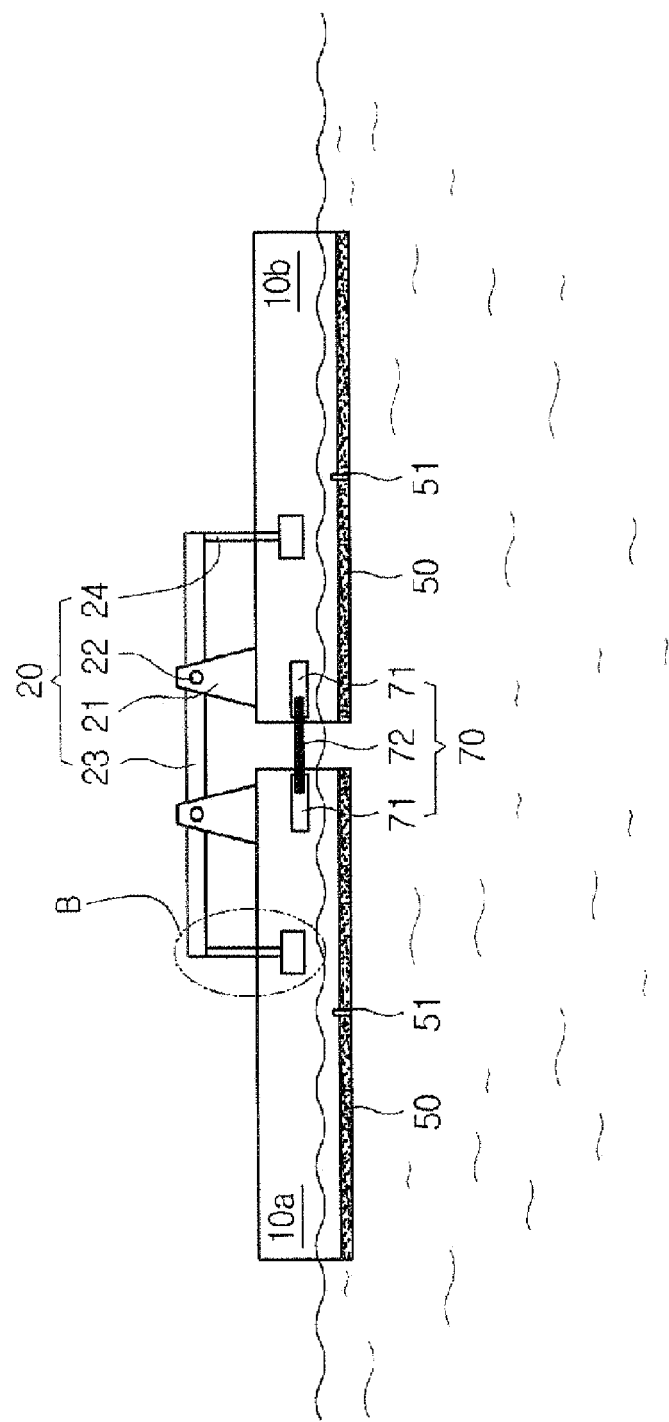
FIG. 5 is a schematic structural view showing a wave power generator according to an exemplary embodiment of the present invention.
Figure 6:
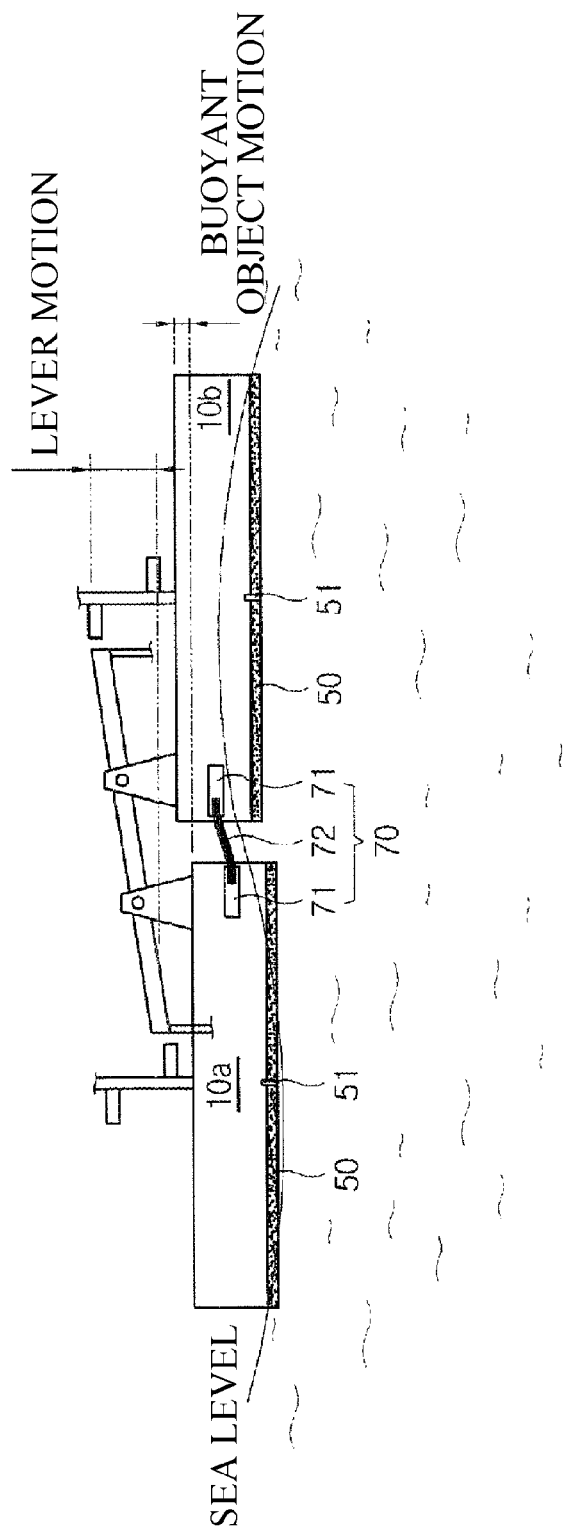
FIG. 6 is an explanatory view of partial motion of FIG. 5.
Figure 7:
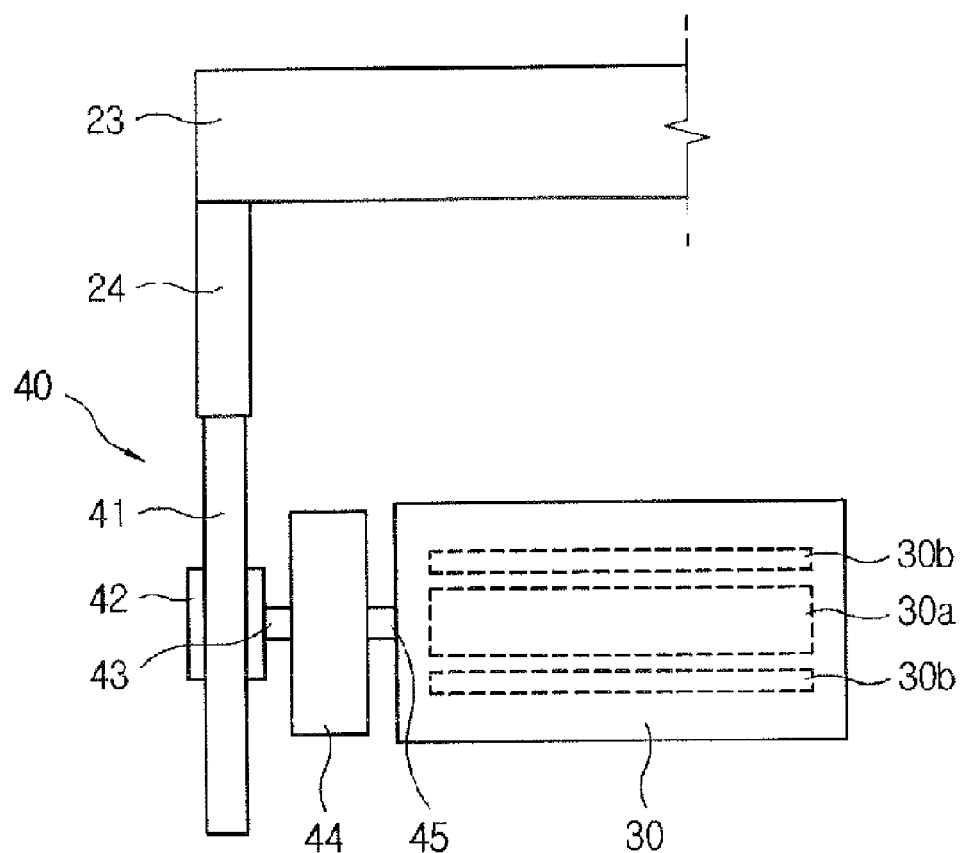
FIG. 7 is an enlarged view of region B of FIG. 5.
Figure 8:
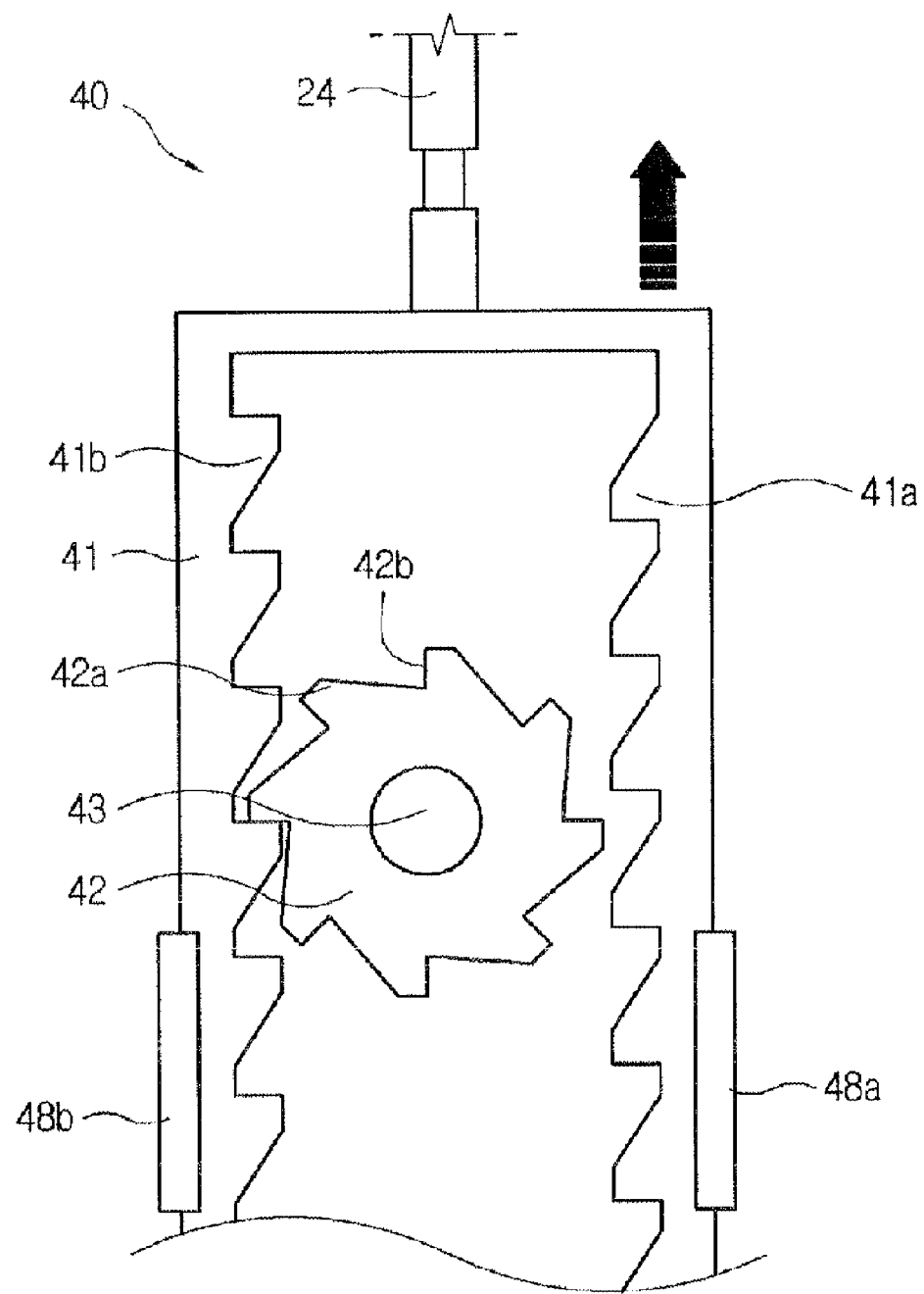
FIGS. 8 and 9 each show the operation of FIG. 7.
Figure 10:
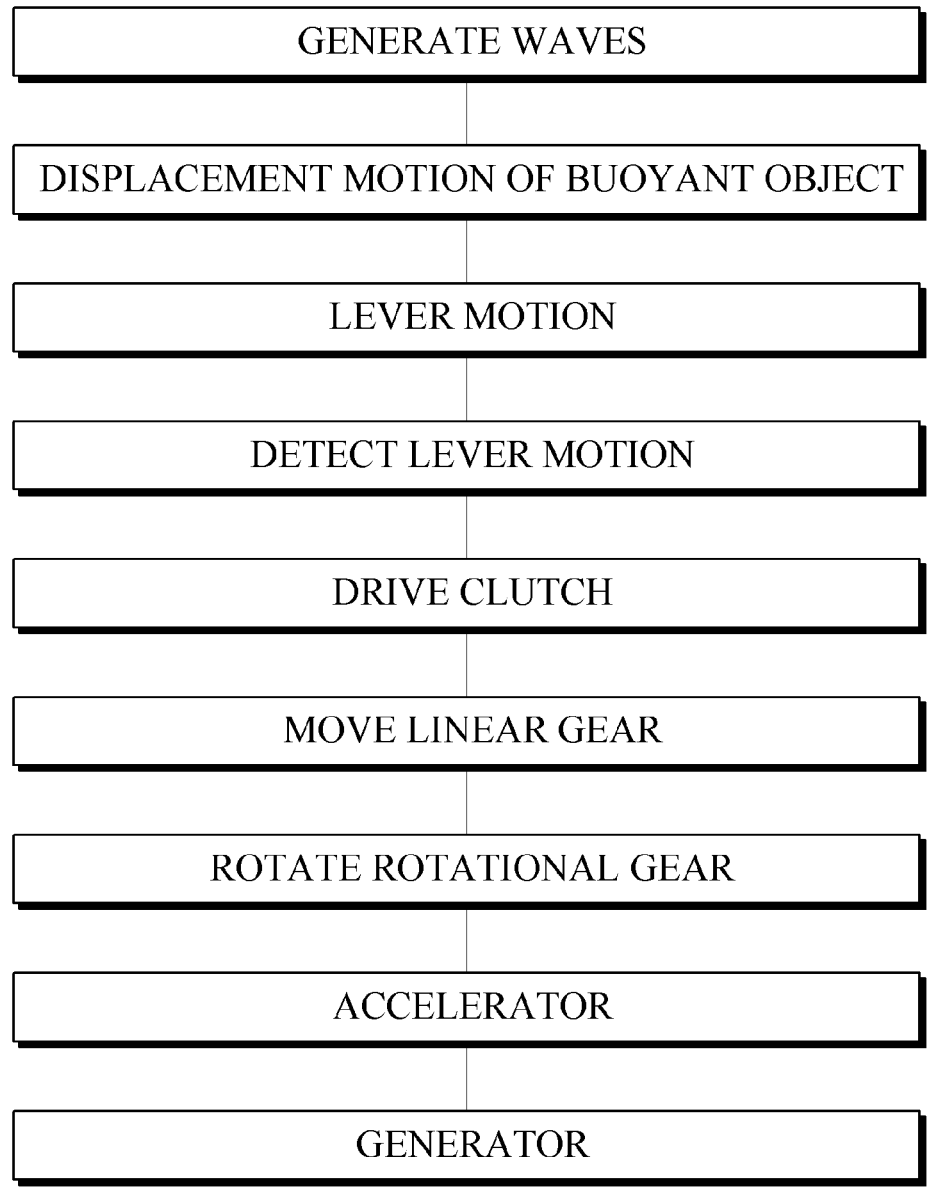
FIG. 10 is a flowchart of the wave power generator according to the exemplary embodiment of the present invention.
Figure 11:
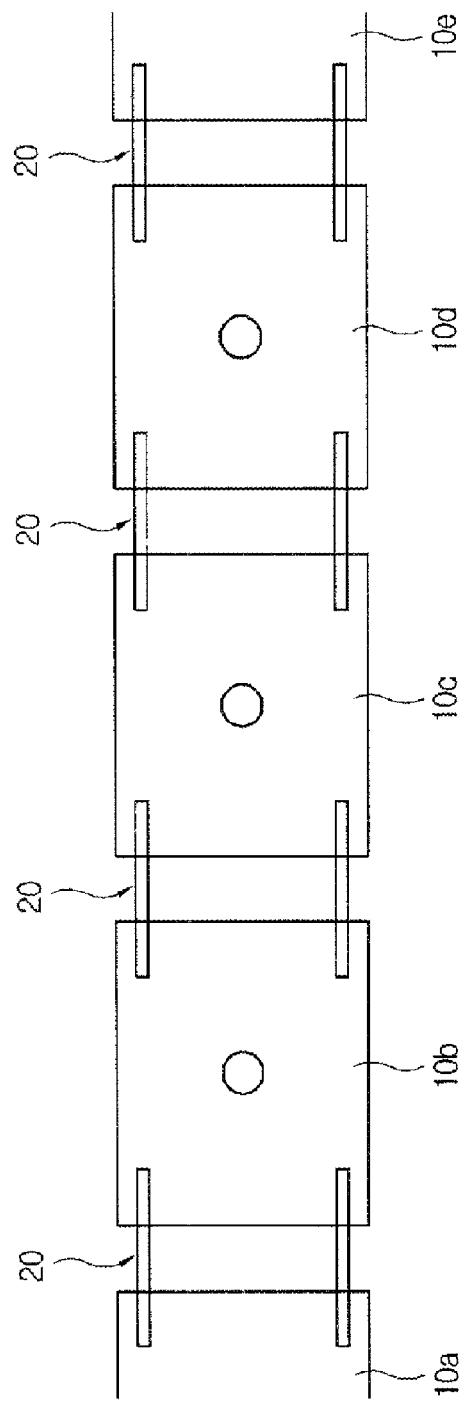
FIG. 11 is a plan view of an installation structure of the wave power generator according to an exemplary embodiment of the present invention.

FIG. 4 is an explanatory view of the principle of leverage, and FIG. 5 is a schematic structural view showing a wave power generator according to an exemplary embodiment of the present invention. FIG. 6 is an explanatory view of partial motion of FIG. 5, and FIG. 7 is an enlarged view of region B of FIG. 5. FIG. 8 is a front structural view of FIG. 7. FIG. 9A and FIG. 9B each show the operation of FIG. 8. FIG. 10 is a flowchart of the wave power generator according to the exemplary embodiment of the present invention, and FIG. 11 is a plan view of an installation structure of the wave power generator according to an exemplary embodiment of the present invention.

Referring to the figures, mainly FIGS. 5 and 6, the wave power generator of the present embodiment includes a plurality of rafts 10a and 10b that are disposed on a surface of water and freely move according to the surface level of sea wave, a plurality of couplers 20, each of which interconnects the neighboring rafts 10a and 10b, converts wave motion of one 10a of the rafts into an amplified lever motion of the other raft 10b in order to convert kinetic energy, a plurality of generators 30 that are installed on the respective rafts 10a and 10b so as to generate electricity, and energy conversion units 40 that are connected to the respective couplers 20 and generators 30 and convert the kinetic energy from the couplers 20 into rotational energy for driving the generators 30.

In the present embodiment, for convenience of description, the two rafts 10a and 10b are only illustrated as in FIGS. 5 and 6. A connection structure between the rafts 10a to 10e (or more) may have an arrangement of three or more rafts as in FIG. 11.

Accordingly, the connection structure between the rafts 10a to 10e (or more) or the number of the rafts 10a to 10e (or more) may be appropriately designed according to environmental conditions of a location where the wave power generator is to be installed and an amount of generated power.

Hereinafter, only the two rafts 10a and 10b shown in FIGS. 5 and 6 will be assigned different reference numerals, while the other rafts will be assigned the same reference numeral for convenience of description.

First, the rafts 10a and 10b refer to objects that are disposed on the surface of water and make free motion according to the surface level of wave. Thus, the rafts 10a and 10b are formed of a material that has predetermined buoyancy and is not submerged in water. The rafts 10a and 10b are first means for wave energy. A detailed explanation will be made for the conversion of the wave energy caused by the rafts 10a and 10b, as follows.

As described above, the waves are generated by vertical motion of a water medium, and are considered to be similar to an undulatory motion.

The buoyant rafts 10a and 10b are pitched on the surface of water according to an undulatory motion. The kinetic energy of the raft 10a can be converted into mechanical energy using a reaction of the neighboring raft 10b.

This structure is typical, but has a problem in that, when the wave is great in height or amplitude, and long in wavelength and cycle, it is subjected to a decrease in the efficiency of energy conversion and the resultant low economic efficiency.

In fact, in the case of coastal waters, the wave has a low frequency of generation, and a long cycle ranging from several seconds to tens of minutes, in the seasons other than winter, so that such a wave serves as a barrier to practical use.

Thus, a method of increasing the efficiency of energy conversion of the wave that is low in amplitude but is relatively high in the frequency of generation is the heart of the present invention. To this end, a method of adjusting a size and weight of the rafts 10a and 10b to increase their buoyancies can be taken into account.

When motional strokes of the rafts 10a and 10b caused by waves are increased mechanically, the efficiency of energy conversion is increased, so that the kinetic energy can be converted into energy that can be practically used.

FIG. 4 is an explanatory view for the principle of leverage.

Referring to FIG. 4, for example, with use of the principle of leverage in which a distance ratio based on a fulcrum is 1:5, when the rafts 10a and 10b moved by waves have an amplitude of 20 cm and a cycle of 4 seconds, they can reduce a force (action) to one fifth (⅕), and increase the amplitude from 20 cm to a maximum of 100 cm.

If the buoyancy is 1,000 tons, the rafts having, for instance, a weight of 200 tons may convert the buoyancy into kinetic energy with which they can move vertically up and down by 25 cm per second (linear motion of 50 cm/sec).

In the present embodiment, each of the rafts 10a and 10b is made, for example, so that dimensions thereof are 25 m long, 25 m wide, and 25 m high so as to have a buoyancy of 1,000 tons. However, the raft is not limited to this size.

In the present embodiment, the coupler 20 interconnects the rafts 10a and 10b, and converts the wave motion of one raft 10a into a lever motion of the neighboring raft 10b, thereby generating kinetic energy.

One coupler 20 may be installed between the rafts 10a and 10b. As described above, taking into consideration that the rafts 10a and 10b have a large size, a pair of couplers 20 may be installed between the rafts 10a and 10b.

This coupler 20 includes a plurality of pivot joints 21 that are coupled to the respective rafts 10a and 10b at lower ends thereof, a rod-shaped lever 23 that is coupled to the plurality of pivot joints 21 via hinge shafts 22 and is at least disposed across the rafts 10a and 10b, and connecting arms 24 that connect opposite ends of the lever 23 to the energy conversion units.

The rod-shaped lever 23 is a medium that pivots about the hinge shaft 22 of each pivot joint 21 according to the height of the wave and transmits the generated kinetic energy to the connected arms 24. This lever 23 cooperates with the rafts 10a and 10b. As shown in FIG. 6, the lever 23 moves to a much greater height than the rafts 10a and 10b. As such, even when the wave height is low, a stroke of the lever 23 is great, so that it is possible to effectively produce much electricity.

The generator 30 is an apparatus that ultimately generates electricity based on rotational energy. As schematically shown in FIG. 7, the generator 30 of the present embodiment also serves to generate electricity between a rotator 30a and a stator 30b disposed outside the rotator 30a while the rotator 30a is rotating according to Fleming's right-hand law, like typical generators.

In the present embodiment, in consideration of a size, capacity, and cost, the generator 30 is designed as a low-speed generator. However, the present invention is not essentially limited to this generator.

As shown in FIGS. 7 to 9B, the energy conversion unit 40 includes a linear gear 41 that is connected to the connecting arm 24 on one side thereof so as to move up and down and is provided with first and second one-way linear rows of teeth 41a and 41b on opposite inner surfaces thereof which are disposed in opposite directions, a rotational gear 42 that is disposed in the linear gear 41, is selectively engaged with the first and second one-way linear rows of teeth 41a and 41b, and is provided with a one-way rotational row of teeth 42a so as to be rotated in one direction, an accelerator 44 that accelerates the rotational motion of the rotational gear 42, and a connecting shaft 45 that connects the accelerator 44 and the rotator 30a of the generator 30.

In the present embodiment, the energy conversion unit 40 may be provided in a ratchet gear type in which the one-way rotational row of teeth 42a of the rotational gear 42 is engaged with one of the linear rows of teeth 41a and 41b of the linear gear 41 while the linear gear 41 is moving up and down in response to the motion of the lever 23. Such a ratchet gear is a kind of gear that can interact with the linear gear 41 only when each linear pressure face 42b comes into contact with one of the linear rows of teeth 41a and 41b of the linear gear 41.

Further, in the present embodiment, the energy conversion unit 40 includes safe guides 48a and 48b that are installed near the linear gear 41 to generate a signal for restricting a moving distance of the linear gear 41.

The safe guides 48a and 48b may be provided as contact or non-contact sensors. Particularly, the safe guides 48a and 48b are installed on the left and right sides of the linear gear 41 in a pair, and restrict a transversely moving distance of the linear gear 41. As a result, the linear gear 41 can serve to move only within the pair of safe guides 48a and 48b.

For reference, the conventional conversion to the mechanical energy is adapted to convert an axial momentum into the pressure of a fluid so as to drive a turbine or a hydraulic motor. In the process of converting the energy, energy loss occurs to lower conversion efficiency.

However, in the present embodiment, as described above, the motion of the rafts 10a and 10b is motorized by direct conversion into a mechanical motion in the same direction, so that the present invention can perform the energy conversion in a more efficient manner than the related art.

As described above, it is necessary to complement the case of low height and long wavelength of the wave. Thereby, the energy efficiency is increased.

For example, the horizontal motion of the rafts 10a and 10b causes a weak reaction due to floating and sliding phenomena of the rafts 10a and 10b, so that it is difficult to convert the motion into energy. However, the rolling of the rafts 10a and 10b caused by the waves can be converted into the energy.

When this is applied, it is possible to complement the conversion of the kinetic energy of the rafts 10a and 10b between the wave cycles when the wavelength of the wave is long.

As means for energy conversion using the rolling of the rafts 10a and 10b, i.e. means for complementing the kinetic energy of the rafts 10a and 10b, a ballast tank 50 may be coupled to a bottom of each of the rafts 10a and 10b. The ballast tank 50 adjusts a mass of each of the rafts 10a and 10b using an amount of water. The ballast tank 50 is provided with at least one partition 51 therein. The partition 51 is means for allowing the water to flow in the ballast tank 50, and may be used as an auxiliary means for deriving the stable rolling of the rafts 10a and 10b.

As shown in FIGS. 5 and 6, the wave power generator of the present embodiment further includes a connecting joint 70 that interconnects the rafts 10a and 10b. The connecting joint 70 includes hydraulic cylinders 71 that are mounted in the respective rafts 10a and 10b, and a universal joint 72 that connects the hydraulic cylinders 71.

An operation of the wave power generator having this construction will be described below with reference to FIG. 10. For convenience, no reference numerals are given in FIG. 10.

First, when the rafts 10a and 10b move according to the wave height, the lever 23 moves in cooperation with the motion of each of the rafts 10a and 10b. In this case, as shown in FIG. 6, since the motion of the lever 23 is greater than that of each of the rafts 10a and 10b, much electricity can be effectively produced.

When the connecting arm 24 moves upwards, for instance, in an arrow direction of FIG. 8 due to the motion of the lever 23, the one-way rotational row of teeth 42a of the rotational gear 42 is engaged with the first one-way linear row of teeth 41a of the linear gear 41. In this state, as the linear gear 41 moves upwards, the rotational gear 42 rotates in a counterclockwise direction.

Figure 9:
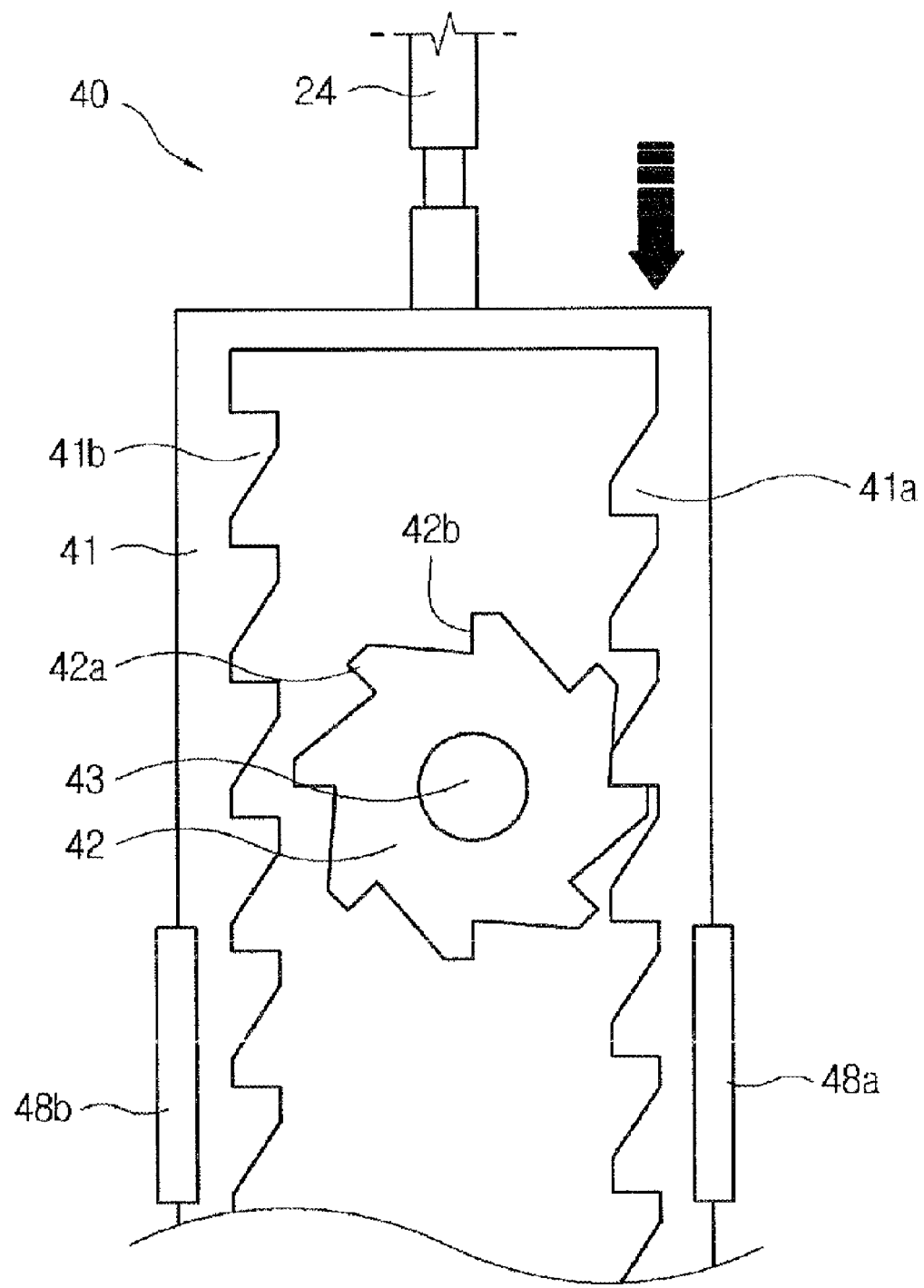

Next, when the connecting arm 24 moves downwards, for instance, in an arrow direction of FIG. 9 due to the undulation of the wave, the one-way rotational row of teeth 42a of the rotational gear 42 is engaged with the second one-way linear row of teeth 41b of the linear gear 41. In this state, as the linear gear 41 moves downwards, the rotational gear 42 continues to rotate in a counterclockwise direction.

Consequently, the rotational gear 42 continues to rotate in a counterclockwise direction by this structural characteristic, thereby generating rotational energy. This rotational energy is transmitted to the generator 30 through a gear shaft 43 of the rotational gear 42 via the accelerator 44 and the connecting shaft 45, so that electric energy can be generated from the generator 30, and the generated electricity can be used as it is or stored.

Taking this structure and operation into collective consideration, various types of wave power generation that have been developed and applied up to now have been passive in the aspect of investment and research activity due to low energy conversion efficiency and prejudice against uncertainty of natural environments. However, according to the present embodiment, first, the rafts 10a and 10b are allowed to be reduced in force of action and to be increased in distance of motion when the momentums thereof are the same, so that the speed of motion is improved, and thus the efficiency of energy conversion is actually increased remarkably.

Of course, although there is a need for technology for manufacturing and motorizing the rafts 10a and 10b, this need can be sufficiently resolved by a current technological level. Particularly, when a power generation system is mounted on the rafts 10a and 10b, this inhibits a demand for land, requires no huge structures, and reduces previous investment.

Unlike other existing power generators, the wave power generator of the present embodiment has no combustion system and does not need to consume a chemical product such as a storage battery, so that it is free from environmental pollution and is reduced in operational expenses.

Further, the wave power generator of the present embodiment is easily transported to provide free change and selection to an effective shore, so that a preparation period and costs can be saved, because the limitations to location and season of the wave energy are not fixed.

Particularly, the wave power generator of the present embodiment serves to complement a reduction in an amount of electric power of water-power generation in the winter as a droughty season, and is effective in supplying electric power to an insular district.

When the rafts 10a and 10b on each of which a middle-scale low-speed generator is mounted are interconnected and synchronized, commercial power is expected to be able to be supplied immediately.

When the aforementioned system is applied, it is determined that the power supply is possible at an economical price, and it has a chance of being put into practical use in a territorial environment of Korea surround by seas on three sides. For example, the system has the opportunity to take advantage of clean energy source close to 5,000,000 kw.

According to the present embodiment, the energy conversion efficiency is relatively high, which makes it possible to overcome the uncertainty of the natural environment and encourage positive investment and research activities. Above all, it is possible to increase the efficiency over investment, and thus to improve applicability and merit as the clean energy resource.

Figure 12:
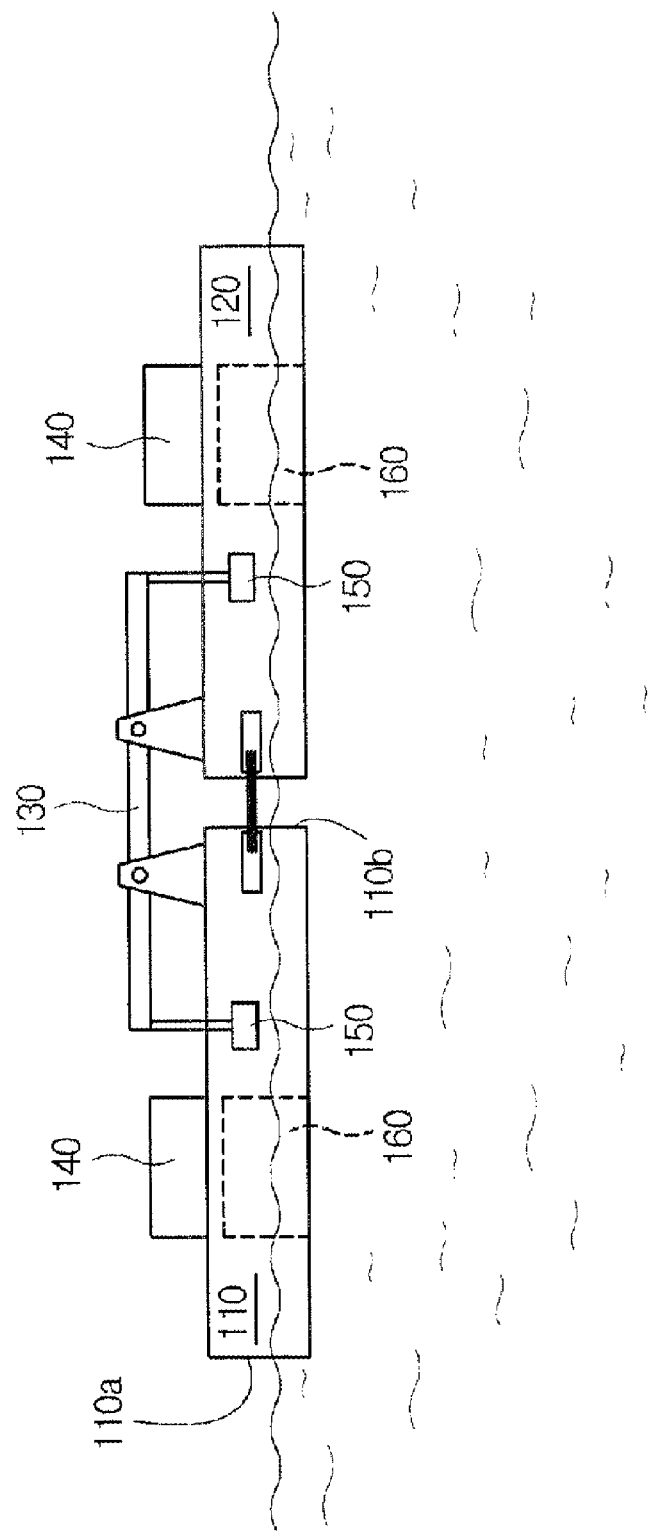
FIG. 12 is a schematic section view of structure showing a wave power generator according to another exemplary embodiment of the present invention.
Figure 13:
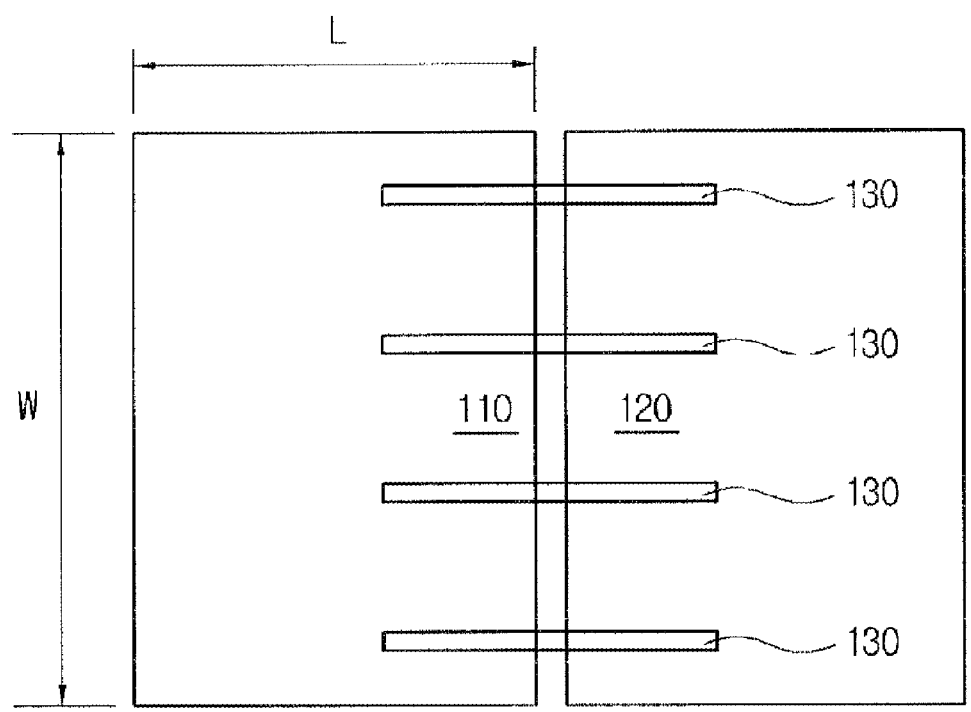
FIG. 13 is a plan view of structure of FIG. 12.
Figure 14:
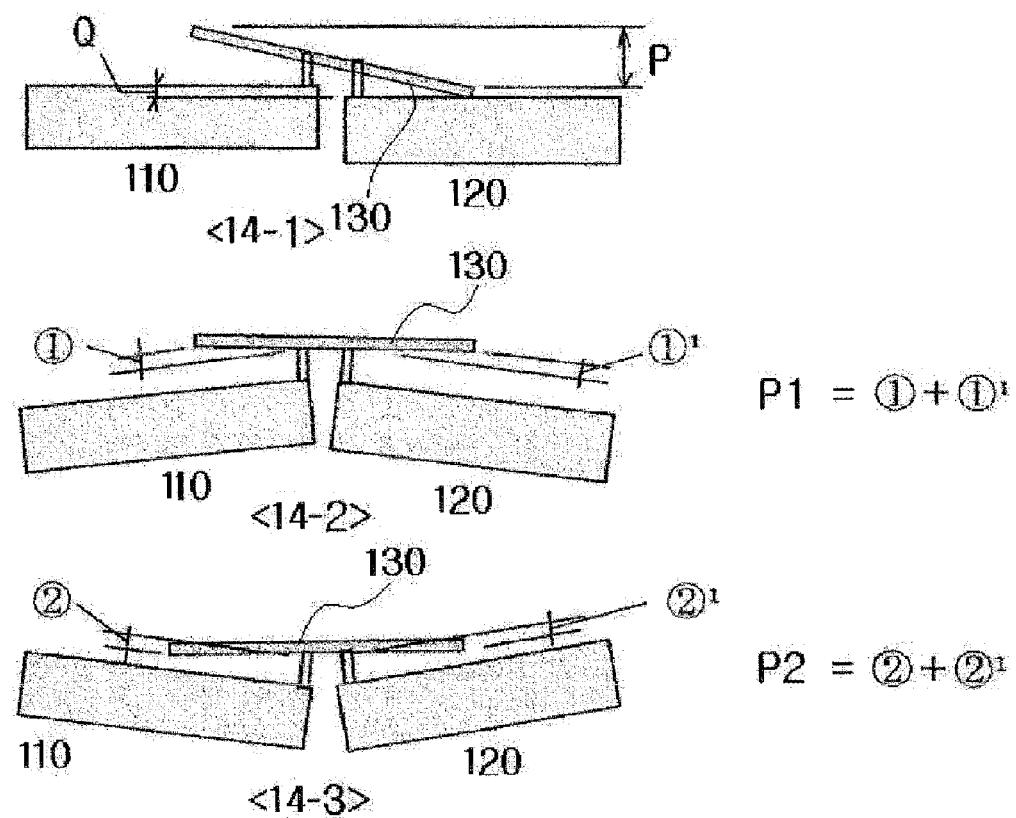
FIG. 14 is an explanatory view of the operation of a lever.
Figure 15:
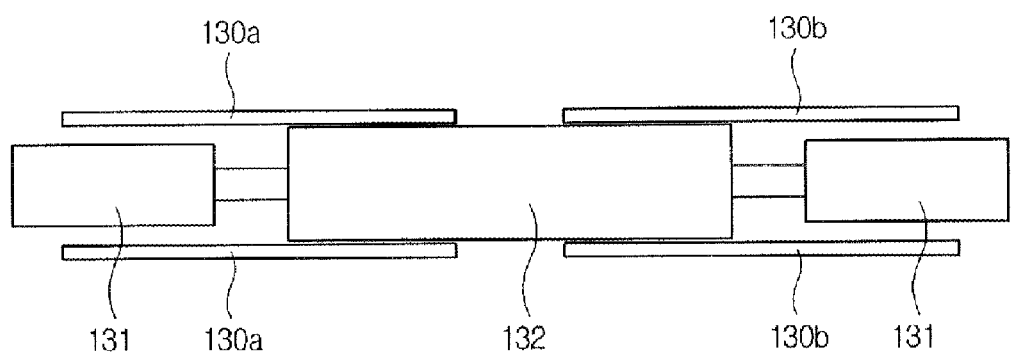
FIG. 15 is a schematic structural view of the lever.
Figure 16:
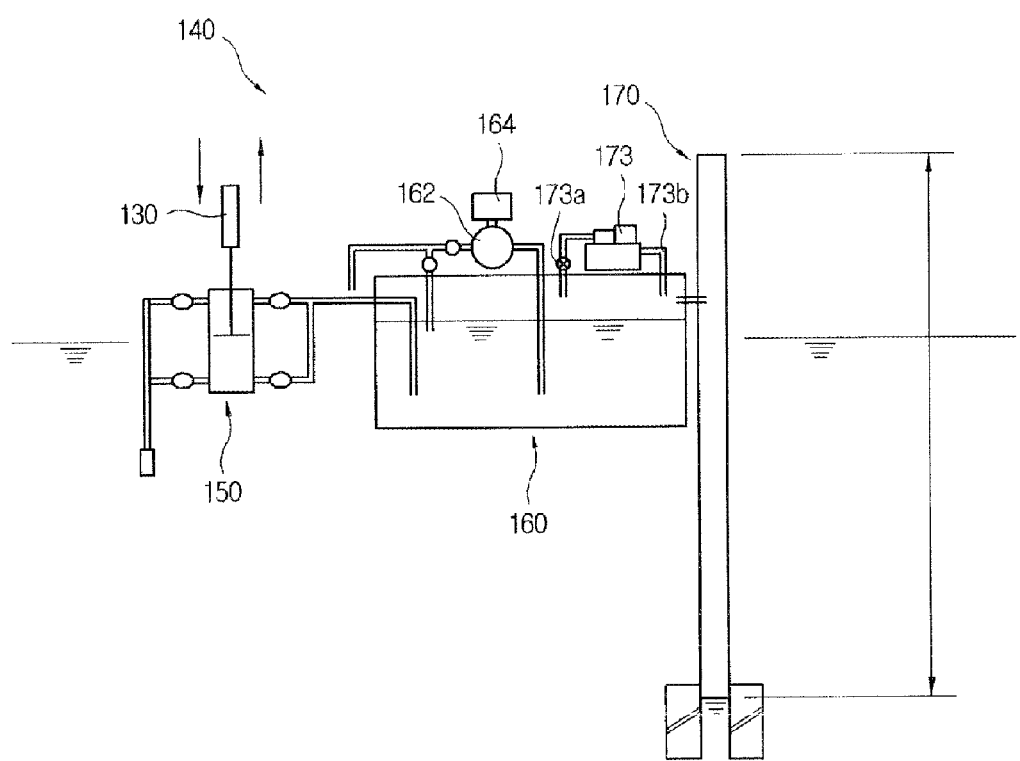
FIG. 16 is a block diagram of an energy generation unit.

FIG. 12 is a schematic side structural view showing a wave power generator according to another exemplary embodiment of the present invention. FIG. 13 is a plan structural view of FIG. 12. FIG. 14 is an explanatory view of the operation of a lever. FIG. 16 is a schematic structural view of the lever.

Prior to describing a detailed structure with reference to FIGS. 12 and 13, stationary pitching or rolling that buoyant objects, i.e. first and second rafts 110 and 120, undergo depending on ascent or descent of the height of a wave will be briefly explained.

Here, wave energy E converted from the motion of the first and second rafts 110 and 120 can be calculated as in Equation 1 below.

$$E = mgh/s \quad \text{Equation 1}$$

where E is the conversion energy (W), m is the mass of a buoyant object (kg), g is the gravitational acceleration (9.8 m/sec$^2$), h is the height (m) that is equivalent to the wave height, and s is the cycle of motion (sec) that is equivalent to the wave cycle.

For example, the conversion energy of a raft which the waves having a wave cycle (W/C) of 10 sec requires to raise the raft having a mass of 100 tons to 1 meter is 98 (kW) (=100(t)×9.8×1(m)/10 (sec)). When W/C is 5 sec, the conversion energy is 196 (kW).

In Equation 1 above, the conversion energy is proportional to the wave height (W/H) and the mass of the raft, and is inversely proportional to the W/C. Obtaining stable energy output, when the W/H is high, the mass of the raft can be reduced. When the W/H is low, the mass of the raft can be relatively increased. Thereby, it is possible to deal with excessive variation of an output. The mass of the raft may serve as a means of coping with excessive running in the event of abnormal W/H. Since the mass of the raft can be determined by an underwater volume, the raft is filled with water, thereby adjusting an underwater depth even in the case of the same bottom area (horizontal area), so that the mass of the raft can be changed.

Meanwhile, to pull out the kinetic energy of the raft, there must be another neighboring reaction raft. Thus, as in the present embodiment of FIG. 12, at least two rafts should be combined. A displacement difference between the first and second rafts 110 and 120 may be a target for the energy conversion.

Referring to FIG. 12, the wave power generator of the present embodiment includes first and second rafts 110 and 120, a lever 130 interconnecting the first and second rafts 110 and 120, and an energy generation unit 140 that is connected with the lever 130 and generates energy using kinetic energy of the lever 130.

The first raft 110 is disposed on a surface of water, has the shape of a barge in which a fluid can be filled so as to freely move according to the wave height and to be able to adjust an underwater depth, and is manufactured so that a length thereof in a direction where the wave proceeds is less than a half of a design wavelength. This first raft 110 may have a structure in which a front face thereof is formed as a curved portion 110a in a direction where the wave is incident so as to reduce frictional resistance to water, and a rear face thereof may be formed as a vertical portion 110b. However, the first raft 110 may have a block structure as shown in FIG. 12.

The second raft 120 is connected with the first raft 110 in a lengthwise direction of the first raft 110, and is manufactured in the same structure as the first raft 110. Meanwhile, the first and second rafts 110 and 120 may be designed so as to have a size (L×W) in consideration of an energy level of the wave (7 to 8 kW).

In the process of the energy conversion by the first and second rafts 110 and 120, the most ideal, efficient method is a method of obtaining output power by converting the motion of the first and second rafts 110 and 120 into potential energy of water and by driving a water turbine 162, as in the present embodiment. This method can ensure a uniform output, and provides efficiency of the water turbine 162 with 90% or more. As such, this method has been known to have a remarkably high output compared to other conversion methods.

The lever 130 is connected with the first and second rafts 110 and 120, and moves together with the first and second rafts 110 and 120.

The motion of the lever 130 will be described with reference to FIG. 14. First, as in <14-1> of FIG. 14, when the first and second rafts 110 and 120 move up and down, i.e., when the first and second rafts 110 and 120 move by a vertical displacement Q, a moving distance of the lever 130, i.e., a displacement P of the lever, 130 is greatly increased. In other words, even when the first and second rafts 110 and 120 move slightly up and down, the displacement P of the lever 130 becomes great.

Figure 1:
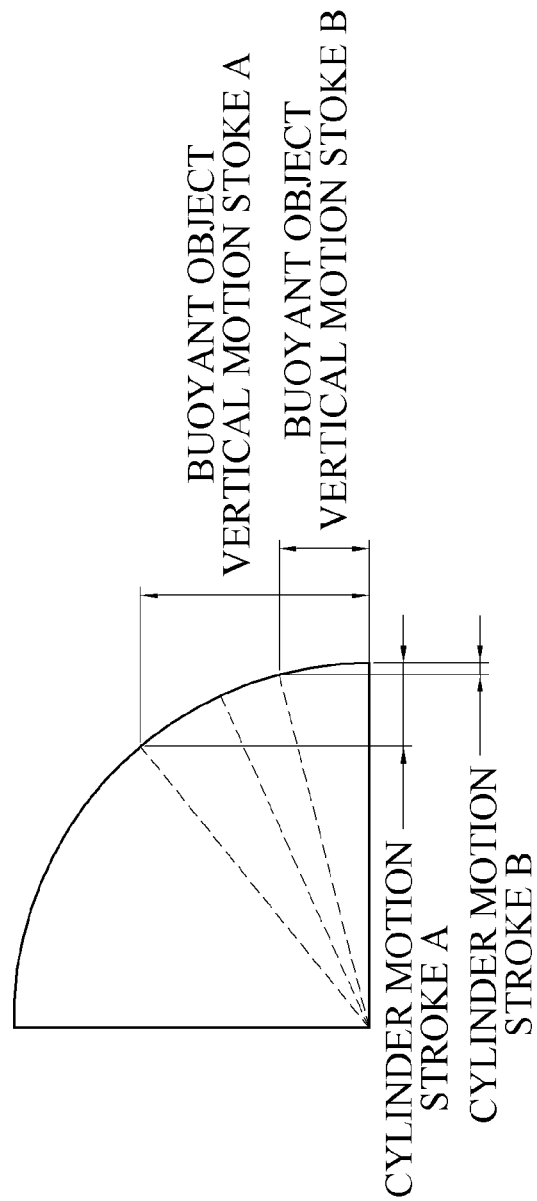
FIG. 1 is a view showing a relation of a motion stroke of a cylinder relative to a top-bottom motion stroke of a buoyant object.
Figure 2:
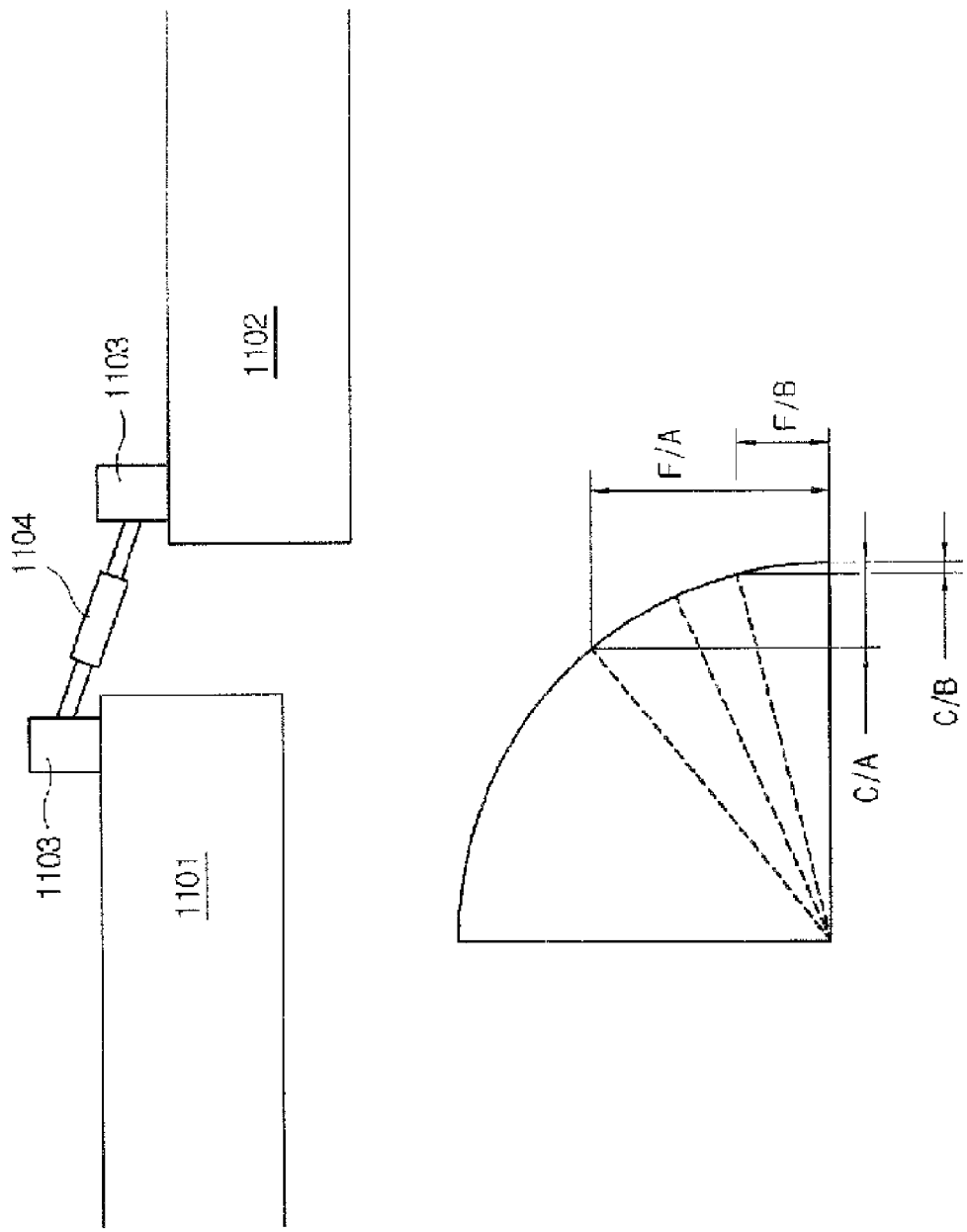
FIGS. 2 and 3 are schematic views of a conventional wave power generator.
Figure 3:
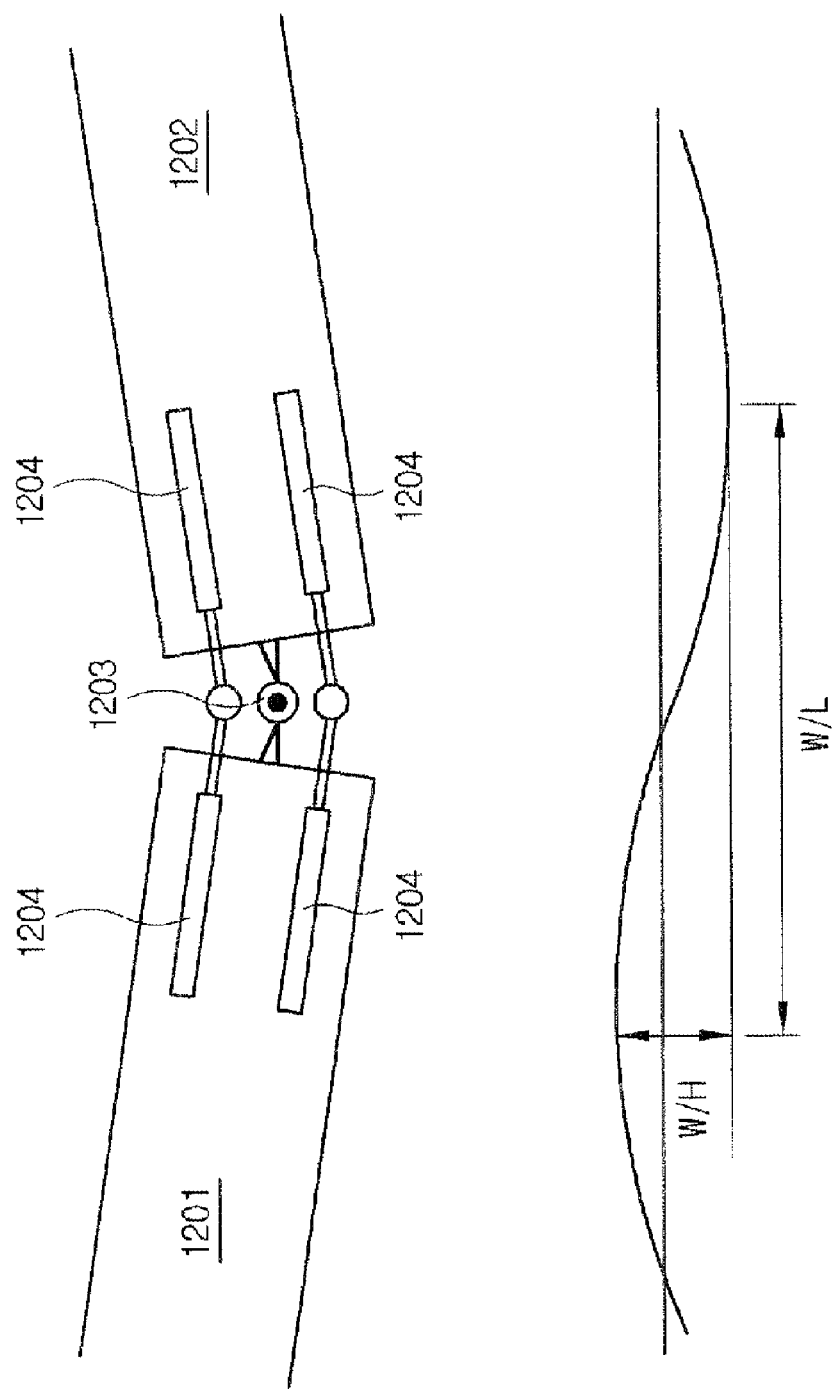

However, in <14-2> and <14-3> of FIG. 14 where the first and second rafts 110 and 120 undergo inclined displacement according to a waveform, the displacement of the lever 130 is not very great. In detail, in <14-2> of FIG. 14 where the first and second rafts 110 and 120 are inclined to have a shape of a wave peak, the entire displacement P1 of the lever 130 is a sum (+') of the displacement of the lever 130 on the side of the first raft 110 and the displacement of the lever 130 on the side of the second raft 120. In <14-3> of FIG. 14 where the first and second rafts 110 and 120 are inclined to have a shape of a wave root, the entire displacement P1 of the lever 130 is a sum (+') of the displacement of the lever 130 on the side of the first raft 110 and the displacement of the lever 130 on the side of the second raft 120. However, in <14-2> and <14-3> of FIG. 14 where the first and second rafts 110 and 120 undergo the inclined displacement, it can be found that the displacement of the lever 130 is not as great as when the first and second rafts 110 and 120 move up and down as in <14-1> of FIG. 14. In fact, as in FIG. 2 above, the wavelength W/L is greater than the wave height W/H, and thus an amount of curved displacement is not great.

Thus, the lengths of the rafts 110 and 120 are set to a half of a design wavelength so as to make best use of a water level difference between the wave peak and the wave root when the first raft 110 and the second raft 120 that is the reaction raft corresponding to the first raft are connected in the direction where the wave is incident. Thereby, a vertical displacement difference caused by a time difference reaction of buoyancy between the first and second rafts 110 and 120, that is, the vertical displacement as in <14-1> of FIG. 14, is increased. To this end, a structure for the first and second rafts 110 and 120 is proposed as in FIGS. 12 and 13.

Referring to FIG. 16, the lever 130 may be divided into a first raft lever 130a provided on the first raft 110 and a second raft lever 130b provided on the second raft 120. In this case, the first and second raft levers 130a and 130b may be interconnected by a connecting pipe 132 to which a hydraulic cylinder 131 is connected. When this structure is applied, an interval between first and second raft levers 130a and 130b may be adjusted by hydraulic pressure.

Figure 17:
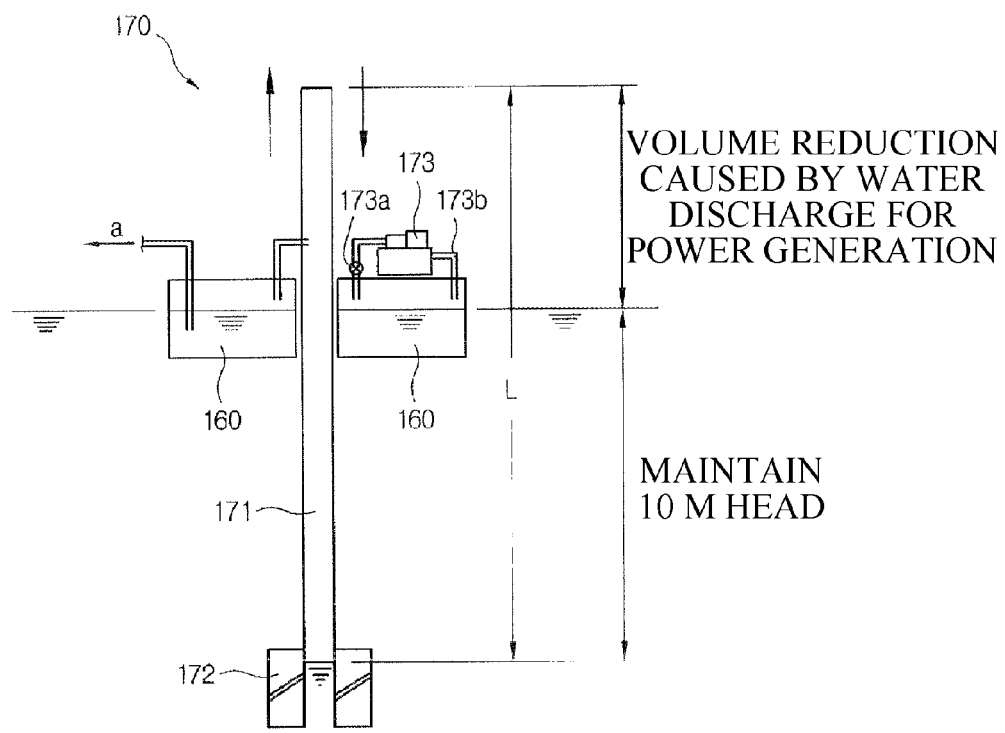
FIG. 17 illustrates construction of the pressure stabilizing apparatus shown in FIG. 16.
Figure 18:
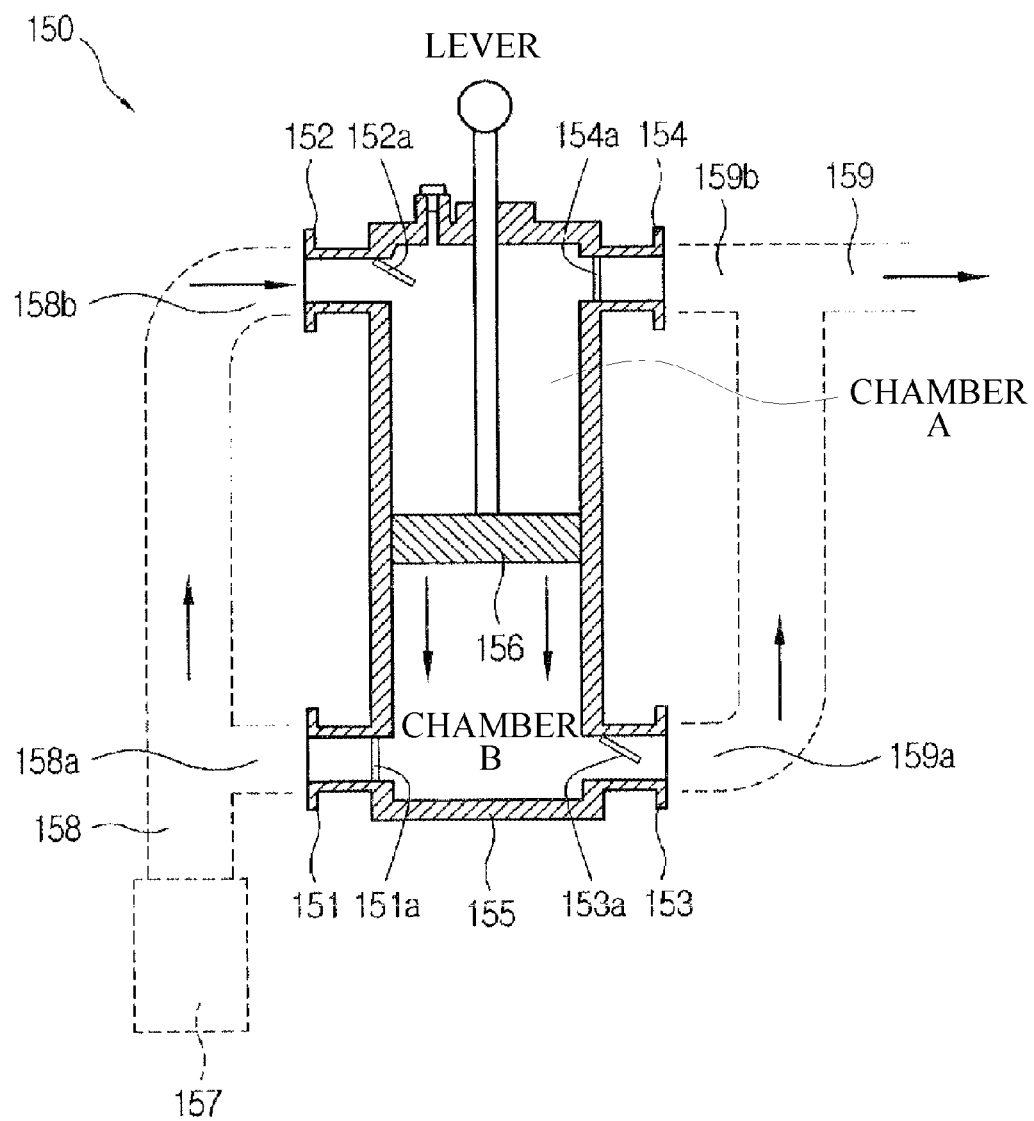
FIGS. 18 and 19 illustrate an operation of the piston pump shown in FIG. 16.
Figure 19:
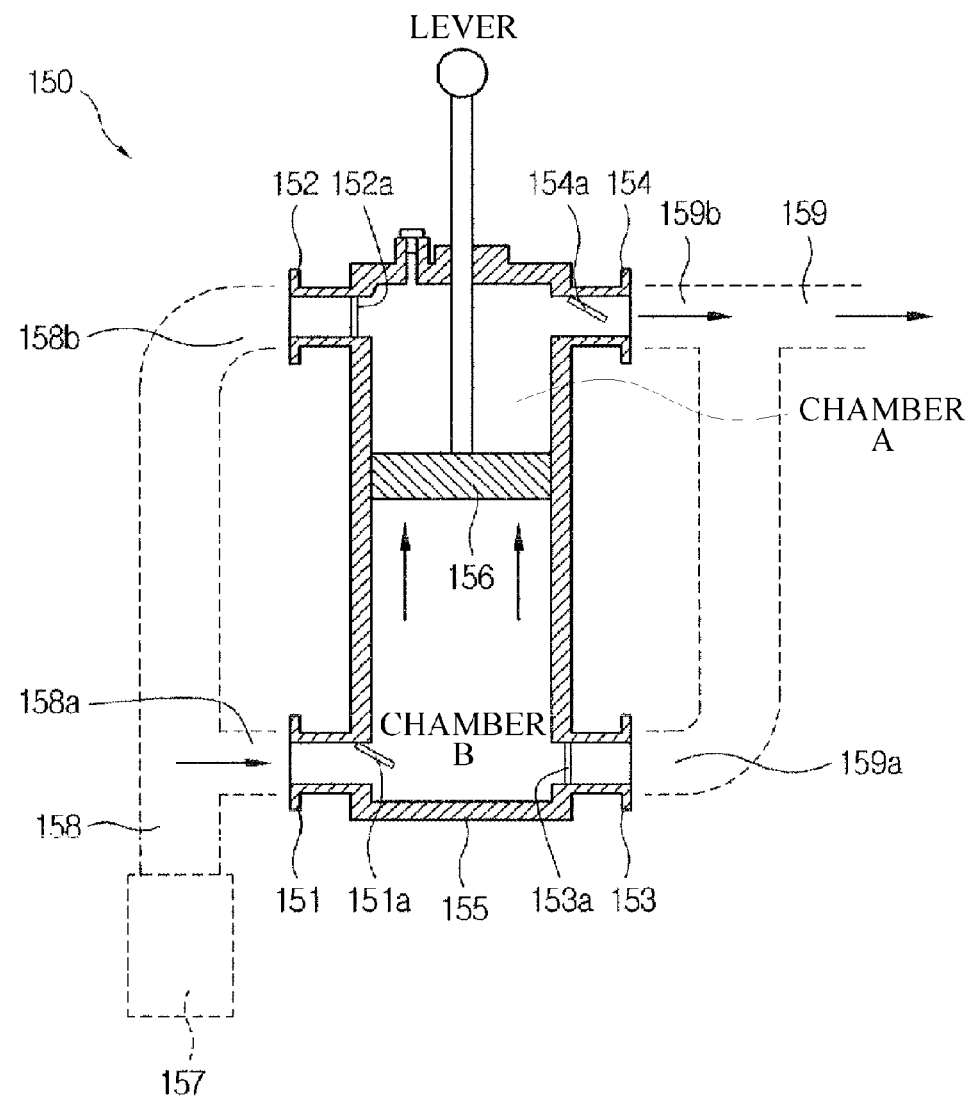

FIG. 16 is a block diagram of an energy generation unit, and FIG. 17 illustrates construction of the pressure stabilizing apparatus shown in FIG. 16. FIGS. 18 and 19 illustrate an operation of the piston pump shown in FIG. 16.

First, referring to FIG. 16, the energy generation unit 140 includes a piston pump 150 that is connected with the lever 130, a pressurized reservoir 160 which is disposed adjacent to the piston pump 150 and in which pressurized water supplied from the piston pump 150 is stored, a water turbine 162 that is rotated using water in the pressurized reservoir 160, a generator 164 that is connected with the water turbine 162 and converts rotational energy caused by rotation into electric energy, and a pressure stabilizing apparatus 170 that is connected to the pressurized reservoir 160.

Further, the energy generation unit 140 further includes an air compressor 173 that selectively supplies or blocks compressed air into or from the pressurized reservoir 160, a pressure sensor 173a that is installed on one side of the air compressor 173 and detects pressure in the pressurized reservoir 160, and an air supply line 173b that is connected to the other side of the air compressor 173.

The pressure stabilizing apparatus 170 will be described first with reference to FIG. 17. The pressure stablizing apparatus 170 includes a pressure stabilizer tank 171 that is vertically disposed on the basis of sea level and has an open lower portion and a closed upper portion, and a weight 172 that is coupled to a lower region of the pressure stabilizer tank 171 and maintains a water level difference between the water in the pressure stabilizer tank 171 and sea level.

The pressure stabilizer tank 171 may be provided for pressure adjustment apart from the pressurized reservoir 160. This pressure stablizer tank 171 should have a minimum allowance volume to complement a pressure drop of the reservoir due to volume reduction conditions resulting from water discharge for power generation (see FIG. 17), and to maintain stable pressure. In FIG. 17, a length L should be calculated as an allowance length taking into account the volume reduction caused by the water discharge for power generation when water level in the pressure stabilizer tank 171 is, for instance, −10 meters.

When pressure is temporarily reduced by the water discharge for power generation or shortage of supply pressure of the piston pump 150, air in the pressure stabilizer tank 171 is automatically supplied to the pressurized reservoir 160. Thus, the pressure stabilizer tank 171 is subjected to a decrease in pressure due to a dead load, and thus the water level in the pressure stabilizer tank 171 is lowered below sea level by an amount of reduced air, so that the pressure in the pressure stabilizer tank 171 is automatically adjusted.

If the pneumatic pressure in the pressure stablizer tank 171 continues to be lowered to a dangerous level and is not recovered, the air compressor 173 is activated. In this case, the pressure sensor 173a detects the pressure of the pressure stabilizer tank 171, and then compressed air is supplied into the pressurized reservoir 160 through the air supply line 173b. Thereby, a pressure drop of the pressure stabilizer tank 171 is prevented, and the pressure stabilizer tank 171 is raised in pressure, thereby inhibiting the pressure from being lowered to the dangerous level, and thus maintaining stable pressure.

As shown in FIG. 18, the piston pump 150 includes a pump body 155 that has first and second water inflow parts 151 and 152 on one-side upper and lower ends thereof and first and second water outflow parts 153 and 154 on the other-side upper and lower ends thereof, a plurality of valves 151a to 154a that are provided in the respective first and second water inflow and outflow parts 151 and 152, and 153 and 154 and selectively open and close respective pipe lines, and a piston 156 that is disposed in the pump body 155 in a transverse direction, is connected with the lever 130, and is driven in a longitudinal direction to control spatial pressure on the sides of the first water inflow and outflow parts 151 and 153 and the second water inflow and outflow parts 152 and 154.

The first and second water inflow parts 151 and 152 are connected with branch pipes 158a and 158b that branch off from a water inflow pipe 158 connected to a foot valve 157 toward the first and second water inflow parts 151 and 152. The first and second water outflow parts 153 and 154 are connected with the pressurized reservoir 160 by a combined pipe 159 in which the respective water outflow pipes 159a and 159b are combined. However, this piping method may be modified as needed.

For reference, the plurality of valves 151a to 154a of the present embodiment may be provided as flat valves that are automatically opened and closed by pressure.

An operation of the piston pump 150 of the present embodiment will be described. The piston pump 150 is translated in opposite forward and backward directions. That is, as shown in FIG. 18, when the piston 156 moves downward, and the valve 154a of the second water outflow part 154 located in a chamber A is automatically closed by pressure of pressurized water to discharge in the pump, and the valve 152a of the second water inflow part 152 is opened to suction seawater. In the case of a chamber B, the valve 151a of the first water inflow part 151 is automatically closed, and the valve 153a of the second water outflow part 153 is opened, and thus pressurized water pressurized by the piston 156 is discharged.

If the piston 156 moves upwards, the valve 151a of the first water inflow part 151 is opened, and the valve 152a of the second water inflow part 152 is closed. Further, the valve 153a of the second water outflow part 153 is closed, and the valve 154a of the second water outflow part 154 is opened. As a result, water flows toward the pressurized reservoir 160 through the first water inflow part 151 and the second water outflow part 154, thereby activating the water turbine 162.

Meanwhile, effects of the energy generation unit 140 will be described below in detail taking a numerical value by way of example.

In the case of tidal power generation, a head drop is about 10 m. To forcibly secure this position energy using a scale model, seawater must be hoisted to a height of 10 m using the piston pump 150, and the reservoir having a predetermined volume must be installed at that position.

In this case, standards of the piston pump 150 for obtaining desired output, a correlation between the pressure and stroke of the piston of the piston pump 150 and the displacement difference between the first and second rafts 110 and 120, and a size and stability of the reservoir to be disposed at a height of 10 m, etc. should be reviewed.

First, taking a small-rated power generation system of about 100 kW by way of example, a flow rate may be calculated as in Equation 2 below.

$$Q=P\div(9.8\times H)=100(\text{kW})\div(9.8\times 10)=1.02(\text{m}^3/\text{sec}) \quad \text{Equation 2}$$

where P: output efficiency of a water turbine (kW), H: head drop (head of fluid, m), Q: flow rate (m$^3$/sec), P=9.8×H×Q, and Q=P/(9.8×H)

It has been found that, in the case of the Korean coast, the average wave height W/H having highest frequency is 0.75 m, and the wave cycle W/C is 5 sec, and that the piston pump 150 whose piston 156 has a cross section of 0.75 m is selected.

If piston cross section 0.75×0.75×3.14/4=0.441 (m$^2$) - - - (1)

If piston stroke is 1.5 (m) - - - (1)

Discharge amount of double acting pump 0.441×1.5×2=1.323 (m$^3$) - - - (1)

Number of required pumps 1.02÷1.323/5 (sec)=3.85≈4- - - reserved two, total six - - - (2)

Piston pressure 0.441×10(m)×9.8×½×(1.5×⅖)=12.97 (Nt) - - - (2)

Estimation of average displacement difference of buoyant object 0.75 (m)×0.75(%)=0.56 (m) - - - (2)

Ratio of displacement of buoyant object to pump stroke 0.56:1.5≈1:3- - - (2)

Minimum volume of reservoir 1.02×10 (W/C sec)=10.2 (m$^3$) - - - (3)

Adjustment of mass of buoyant object 12.97×3 (lever expansion ratio)×4=155.64≈160(t) - - - (3)

*At least one set of buoyant objects (two) are provided, and the numerical values are divided by two, which are applied to the respective buoyant objects.

As can be seen from the above identification number (2), the wave height W/H on the coastal sea around Korea is not high, and thus the displacement difference between the first and second rafts 110 and 120 based on the average wave height W/H is not great. As such, the moving distance should be secured.

To this end, as in the present embodiment, the positions of the fulcrums of the lever 130 are changed without a change in momentum using the principle of leverage, and thereby the moving distance of the end of the lever 130 can be increased or decreased.

The fulcrums of the lever 130 are located at opposite nearest positions, and the opposite ends of the lever 30 that extend so as to be longer than the distance between the fulcrums are connected to the pistons 156 of the piston pumps 150 attached to the first and second rafts 110 and 120, and thus operate the piston pumps with expanded mechanical motion according to the displacement of the first and second rafts 110 and 120. The displacement difference between the first and second rafts 110 and 120 is converted into the expanded mechanical motion at the ends of the lever 130 in proportion to an interval between the fulcrums and a distance between each fulcrum and each end of the lever.

Meanwhile, when the reservoir is mounted high above, this causes unstability of buoyant and structure to the first and second rafts 110 and 120, which increases the manufacturing cost of the first and second rafts 110 and 120 and can render them unattractive.

As an alternative proposal, a method of pressurizing the inside of the reservoir with pressurized air (1 kg/cm$^2$) is possible. However, this method is difficult adopt, because of high consumption of power and a high possibility of causing problems during automatic control when the air compressor is continuously repetitively driven or stopped to compensate for the pressure drop caused by the water discharge for power generation.

Accordingly, as in the present embodiment, for example, when the pressure stabilizer tank 171 that is a vertical air container having a cross section of 2 m$^2$ or more and a height of about 15 m is put into the seawater after the weight 172 is attached to the lower portion thereof to increase the mass, the water level of the pressure stabilizer tank 171 is lower below sea level by the pneumatic pressure together with the pressure stabilizer tank 171, so that a difference between sea level and the water level in the pressure stabilizer tank 171 is increased. When the difference amounts to 10 m, the pneumatic pressure in the pressure stabilizer tank 171 becomes equal to the pressure of a 10 m head.

When the mass and buoyancy of the pressure stabilizer tank 171 are adjusted so as to maintain the water level in the pressure stabilizer tank 171 to be −10 m with respect to sea level, and fine variation of the pressure stabilizer tank 171 is properly adjusted using the air compressor 173, the air in the pressure stabilizer tank 171 is kept under stable pressure. When this pneumatic pressure is transmitted to the pressurized reservoir 160 connected to the piston pump 150, the water stored in the pressurized reservoir 160 is converted into pressurized water having the same energy as the potential energy of 10 m. When this water is discharged, the water activates the water turbine 162 to drive the generator 164.

The motions of the first and second rafts 110 and 120 caused by buoyancy and the resultant change in momentum of the lever 130 lead to high energy efficiency, and the water turbine provides a remarkably higher conversion efficiency from wave energy than an air turbine and a hydraulic motor. As such, there is in fact no method capable of competing with this method in an economical aspect.

As described above, the stability of the wave height W/H has a problem with excessive discharge of energy caused by a typhoon in the summer However, in the present embodiment, this problem can be expected to be resolved if the size, shape, mass, and mooring system of the first and second rafts 110 and 120 are designed in consideration of sufficient safety.

In fact, in the coastal waters, when the wave height W/H is increased, the wavelength W/L is also increased. Thus, the waveform inclination is not abruptly changed according to a change in the wave height W/H, so that an extreme displacement difference of the first and second rafts 110 and 120 has a very low frequency. The problem of the excessive motion of the lever 130 can be resolved by a method of applying automatic control technology to change the distance between the fulcrums or the positions of the fulcrums and by elastic braking of a mooring system.

It goes without saying that, in the environment of Korea surrounded by seas on three sides, tremendous natural/clean energy resources must be actively put into practical use.

In the proposed method, the interval between the rafts, and the ratio between the fulcrums of the lever 130 are adjusted, and the shape and mass of each of the first and second rafts 110 and 120 are adjusted. Thereby, it is possible to easily develop equipment having universal purpose standards (e.g. 10 kW, 100 kW, and 250 kW) corresponding to the average wave height W/H of 0.5 m, 1 m, and 1.5 m. When the parts are standardized, commercialization is possible to provide the equipment at an economical price.

With regard to the variation of the waves according to the season or region, a method of discriminating the regions having similar conditions to a wide zone, and assigning a required amount of power so that a standard power generation facility meeting the wave conditions of the corresponding region meets the power demand, and coping with future environmental changes is a reasonable determination that can reduce effort, time, and investment required for specialized development after a geographical location is selected first and provide production of economical power.

In this method, the power generation facilities themselves have a function of a breakwater when grouped, and thus are able to the protect against a loss of a coastal line. Taking into account a total of expenses that are invested for securing the clean energy and environmental protection, the method can act as an alternative having the highest economical efficiency, and can be expected to be developed for an export industry in future.

In this manner, according to the present embodiment, considering that the wavelength W/L is relatively long, the structures of the first and second rafts 110 and 120 and the lever 130 are effectively improved, and the energy conversion steps are reduced, the mechanical stability and conversion efficiency are increased, and countermeasures against the variation of output are provided, so that it is possible to improve applicability and worth as a competitive energy source, and furthermore to ensure uniform output.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A wave power generator comprising:
a plurality of rafts that are disposed on a surface of water and freely move according to a height of a wave;
a plurality of couplers, each of which interconnects the neighboring rafts, and converts a wave motion of one of the rafts into an amplified lever motion of the other raft in order to convert kinetic energy;
a plurality of generators that are installed on the respective rafts so as to generate electricity; and
energy conversion units that are connected to the respective couplers and generators and convert the kinetic energy from the couplers into rotational energy for driving the generators.

2. The wave power generator according to claim 1, wherein the plurality of couplers comprise:
a plurality of pivot joints coupled to top rafts at one ends thereof, respectively;
rod-shaped levers coupled to the plurality of pivot joints to be pivoted about hinge shafts and disposed to straddle the pair of rafts; and
connecting arms configured to interconnect both ends of the levers and the energy conversion units.

3. The wave power generator according to claim 1, wherein the energy conversion unit comprises:
a parallel linear gear set that is connected to the connecting arm on one side thereof so as to move up and down and is provided with first and second one-way linear rows of teeth on opposite inner surfaces thereof which are disposed in opposite directions;
a rotational gear that is disposed in the linear gear, is selectively engaged with the first and second one-way linear rows of teeth, and is provided with a one-way rotational row of teeth so as to be rotated in one direction;
an accelerator that is connected to a gear shaft of the rotational gear and accelerates the rotational motion of the rotational gear; and
a connecting shaft configured to connect the accelerator and the rotator of the generator.

4. The wave power generator according to claim 3, wherein the energy conversion unit is provided in a ratchet gear type in which the linear row of teeth of the linear gear is engaged with the one-way rotational row of teeth of the rotational gear while the linear gear is moving up and down in response to the motion of the lever.

5. The wave power generator according to claim 3, wherein the energy conversion unit further comprises safe guides that are installed near the linear gear to restrict a moving distance of the linear gear.

6. The wave power generator according to claim 1, further comprising a ballast tank coupled to a bottom of each of the rafts to complement the kinetic energy of the rafts and filled with a certain amount of water to adjust a mass of each of the rafts using the certain amount of filled water.

7. The wave power generator according to claim 6, further comprising at least one partition provided in the ballast tank.

8. The wave power generator according to claim 1, further comprising connecting joints configured to interconnect the neighboring rafts.

9. A wave power generator comprising:
a first raft that is disposed on a surface of water, freely moves according to wave height, has a barge shape in which a fluid can be filled to adjust a submergence depth, and has a length in a wave progress direction smaller than ½ of a design wavelength;
a second raft that is connected to the first raft at a position near the first raft in a longitudinal direction thereof, and has the same structure as the first raft;
a lever configured to interconnect the first and second rafts; and
an energy generation unit that is connected to the lever and generates energy using kinetic energy of the lever.

10. The wave power generator according to claim 9, wherein the lever comprises:
a first lever installed at the first raft; and
a second lever installed at the second raft,
wherein the first and second levers are interconnected to each other by a connecting pipe connected to a hydraulic cylinder so that an interval therebetween is adjusted by a hydraulic pressure.

11. The wave power generator according to claim 10, wherein the energy generation unit comprises:
a piston pump that is connected to the lever;
a pressurized reservoir that is disposed adjacent to the piston pump and stores pressurized water provided from the piston pump;
a turbine configured to be rotated using water in the pressurized reservoir;
a generator that is connected to the turbine and converts rotational energy by the rotation into electrical energy; and
a pressure stabilizing apparatus that is connected to the pressurized reservoir.

12. The wave power generator according to claim 11, wherein the pressure stabilizing apparatus comprises:
- a pressure stabilizer tank that is disposed at upper and lower sides with respect to a surface of seawater and having an open lower portion and a closed upper portion; and
- a weight that is coupled to a lower region of the pressure stabilizer tank and maintains a water level difference between water level in the pressure stabilizer tank and the surface level of seawater.

13. The wave power generator according to claim 11, wherein the energy generation unit further comprises:
- an air compressor configured to selectively supply or shut off compressed air into the pressurized reservoir;
- a pressure detection sensor that is disposed at one side of the air compressor and detects pressure in the pressurized reservoir; and
- an air supply line that is connected to the other side of the air compressor.

14. The wave power generator according to claim 11, wherein the piston pump comprises:
- a pump body having first and second water inflow parts formed at one side thereof in a vertical direction and first and second water outflow parts formed at the other side in the vertical direction;
- a plurality of valves that are provided in the first and second water inflow parts and the first and second water outflow parts and selectively open and close corresponding passages; and
- a piston that is laterally disposed in the pump body, is connected to the lever to be driven in a longitudinal direction, and controls spatial pressures at sides of the first and second water inflow parts and the first and second water outflow parts.

15. The wave power generator according to claim 14, wherein the plurality of valves are flat valves that are automatically opened and closed by pressure.

16. The wave power generator according to claim 14, wherein the first and second water inflow parts are connected to a branch pipe branched off from a water inflow pipe connected to a foot valve toward the first and second water inflow parts, and the first and second water outflow parts are connected to the pressurized reservoir by a combined pipe of water outflow pipes.

* * * * *